(12) United States Patent
Wang

(10) Patent No.: US 8,394,241 B2
(45) Date of Patent: *Mar. 12, 2013

(54) DISTILLATION-TYPE DRINKING FOUNTAIN AND ENERGY-SAVING HEATING UNIT THEREOF

(75) Inventor: Long-Ming Wang, Kaohsiung (TW)

(73) Assignee: Shanghai Ariba Electric Co., Ltd., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 12/856,833

(22) Filed: Aug. 16, 2010

(65) Prior Publication Data

US 2012/0037487 A1   Feb. 16, 2012

(51) Int. Cl.
*B01D 3/02* (2006.01)
*C02F 1/04* (2006.01)
*E03B 9/20* (2006.01)
*B01D 3/42* (2006.01)

(52) U.S. Cl. ............ 202/160; 202/181; 202/185.3; 202/202; 202/167; 202/200; 203/1; 203/2; 203/10; 203/100; 203/DIG. 8; 137/338; 137/391; 210/175; 210/295; 239/24; 392/394

(58) Field of Classification Search ............ 202/160, 202/167, 181, 185.3, 200, 202; 203/1, 2, 203/10, 21, 100, DIG. 8; 239/24; 159/44; 137/338, 391; 210/175, 295; 392/394
See application file for complete search history.

(56) References Cited

U.S. PATENT DOCUMENTS

| 1,964,708 | A | * | 6/1934 | Skow et al. | 202/173 |
|---|---|---|---|---|---|
| 2,803,590 | A | * | 8/1957 | Skow | 202/232 |
| 3,029,068 | A | * | 4/1962 | Skow | 165/141 |
| 3,055,810 | A | * | 9/1962 | Skow | 203/2 |
| 4,754,614 | A | * | 7/1988 | Yuyama | 202/173 |
| 4,953,694 | A | * | 9/1990 | Hayashi et al. | 202/180 |
| 5,200,039 | A | * | 4/1993 | Weber et al. | 202/197 |
| 5,262,013 | A | * | 11/1993 | Beal et al. | 202/232 |
| 5,281,309 | A | * | 1/1994 | Greene | 202/181 |
| 5,286,351 | A | * | 2/1994 | Salmon | 203/1 |
| 5,290,402 | A | | 3/1994 | Tsai | |
| 5,304,286 | A | * | 4/1994 | Palmer | 202/167 |
| 5,314,586 | A | * | 5/1994 | Chen | 202/177 |
| RE35,283 | E | * | 6/1996 | Helmich | 202/176 |
| 5,662,779 | A | * | 9/1997 | Greene et al. | 202/181 |
| 5,705,036 | A | * | 1/1998 | Wu et al. | 202/176 |
| 5,997,738 | A | | 12/1999 | Lin | |
| 6,402,897 | B1 | * | 6/2002 | Gunn | 203/1 |
| 6,582,563 | B1 | * | 6/2003 | Adam et al. | 202/83 |
| 6,623,694 | B1 | | 9/2003 | Ferguson et al. | |

(Continued)

*Primary Examiner* — Virginia Manoharan
(74) *Attorney, Agent, or Firm* — Alan Kamrath; Kamrath IP Lawfirm, P.A.

(57) ABSTRACT

A distillation-type drinking fountain includes a liquid providing unit having a liquid entry; a heat-exchanging tube having a liquid-incoming end, a liquid-outgoing end and a heat-exchanging room; a hot water tank having a body and a heating unit. The body has a heating room communicating with the liquid-outgoing end. A steam pipe has a first end and a second end, with the first end communicating with the heating room. A condensing unit has a condenser tube having one end communicating with the second end. A water-collecting container has a water-storing room communicating with another end of the condenser tube. An energy-saving heating unit includes an energy-saving heat-exchanging tube and a heating device. The energy-saving heat-exchanging tube includes a water-incoming end, a water-outgoing end and an energy-saving heat-exchanging room. An outlet valve communicates with the water-outgoing end.

11 Claims, 5 Drawing Sheets

U.S. PATENT DOCUMENTS

| | | | |
|---|---|---|---|
| 6,830,661 B1* | 12/2004 | Land | 202/83 |
| 2006/0005712 A1* | 1/2006 | Greenwald et al. | 99/275 |
| 2008/0277261 A1* | 11/2008 | Paxton | 202/180 |
| 2010/0065414 A1* | 3/2010 | Rautenbach et al. | 202/167 |
| 2010/0101929 A1* | 4/2010 | Kamen et al. | 202/185.3 |
| 2011/0147194 A1* | 6/2011 | Kamen et al. | 202/185.1 |

\* cited by examiner

DISTILLATION-TYPE DRINKING FOUNTAIN AND ENERGY-SAVING HEATING UNIT THEREOF

BACKGROUND OF THE INVENTION

1. Field of the Invention

The present invention generally relates to a distillation-type drinking fountain and an energy-saving heating unit thereof and, more particularly, to a distillation-type drinking fountain with reduced energy consumption and an energy-saving heating unit thereof.

2. Description of the Related Art

Drinking fountains are generally categorized into distillation-type and boiling-type drinking fountains. The term "distillation" comprises two steps. First, a liquid containing different substances is heated until a predetermined temperature is reached. This allows substances with boiling points lower than the predetermined temperature to be steamed out and substances with boiling points higher than the predetermined temperature to remain where they are. Second, the obtained steam is collected in a container. Based on this, substances with different boiling points can be separated for purification purpose of the liquid.

A conventional distillation-type drinking fountain includes a heating container, a condenser tube and a water-collecting container. The heating container has a sleeve cavity and a heating unit. The sleeve cavity has a receiving room for receiving a liquid to be distilled. The heating unit is disposed in the receiving room and used to heat the liquid contained in the receiving room. The condenser tube has one end communicating with the receiving room via a first pipe, as well as another end communicating with a storage room of the water-collecting container via a second pipe.

When distilling the liquid in the distillation-type drinking fountain, the heating unit heats the liquid in the receiving room until a boiling temperature is reached. The boiling temperature, as a preferred case, is slightly higher than 100° C. in order to vaporize the moisture of the liquid into steam. Then, the obtained steam enters the condenser tube via the first pipe. Since the condenser tube has a lower temperature than the steam, the steam will become water molecules while contacting the condenser tube. The obtained water molecules will flow into the storage room of the water-collecting container via the second pipe. Thus, distilled water is obtained for drinking purposes. The distilled water generally stays in a room temperature that is too cool for drinking purposes. When it is desired to heat the distilled water for drinking purposes, a heating device may be used to heat the distilled water until a proper temperature suitable for drinking purposes is attained.

However, the conventional distillation-type drinking fountain only relies on the heating device for heating the distilled water, leading to great energy consumption. This is because the distilled water generally remains in the room temperature way lower than the proper temperature suitable for drinking purposes. As a result, more energy is required for the heating device to heat the distilled water.

Therefore, it is desired to improve the conventional distillation-type drinking fountain.

SUMMARY OF THE INVENTION

It is therefore the primary objective of this invention to provide a distillation-type drinking fountain and an energy-saving heating unit thereof, with distilled water being preheated using the remaining heat generated during the distillation process for energy saving.

The invention discloses a distillation-type drinking fountain comprising: a liquid providing unit having a liquid entry; a heat-exchanging tube having a liquid-incoming end, a liquid-outgoing end and a heat-exchanging room. The liquid-incoming end communicates with the liquid entry, and the liquid-incoming end and the liquid-outgoing end communicate with the heat-exchanging room. A hot water tank has a body and a heating unit. The body has a heating room communicating with the liquid-outgoing end. A steam pipe has first and second ends, with the first end communicating with the heating room. A first part of the steam pipe is received in the heat-exchanging room. A condensing unit has a condenser tube with one end communicating with the second end. A water-collecting container has a water-storing room communicating with another end of the condenser tube. An energy-saving heating unit includes an energy-saving heat-exchanging tube and a heating device. A second part of the steam pipe is received in the energy-saving heat-exchanging tube. The energy-saving heat-exchanging tube comprises a water-incoming end, a water-outgoing end and an energy-saving heat-exchanging room. An outlet valve communicates with the water-outgoing end of the energy-saving heat-exchanging tube.

Furthermore, the invention discloses an energy-saving heating unit for a distillation-type drinking fountain. The energy-saving heating unit comprises: an energy-saving heat-exchanging tube comprising a water-incoming end, a water-outgoing end and an energy-saving heat-exchanging room. The water-incoming end and the water-outgoing end are located on two ends of the heat-exchanging tube and communicate with the energy-saving heat-exchanging room. A steam pipe extends through the energy-saving heat-exchanging room, and a heating device is arranged for the energy-saving heat-exchanging tube.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
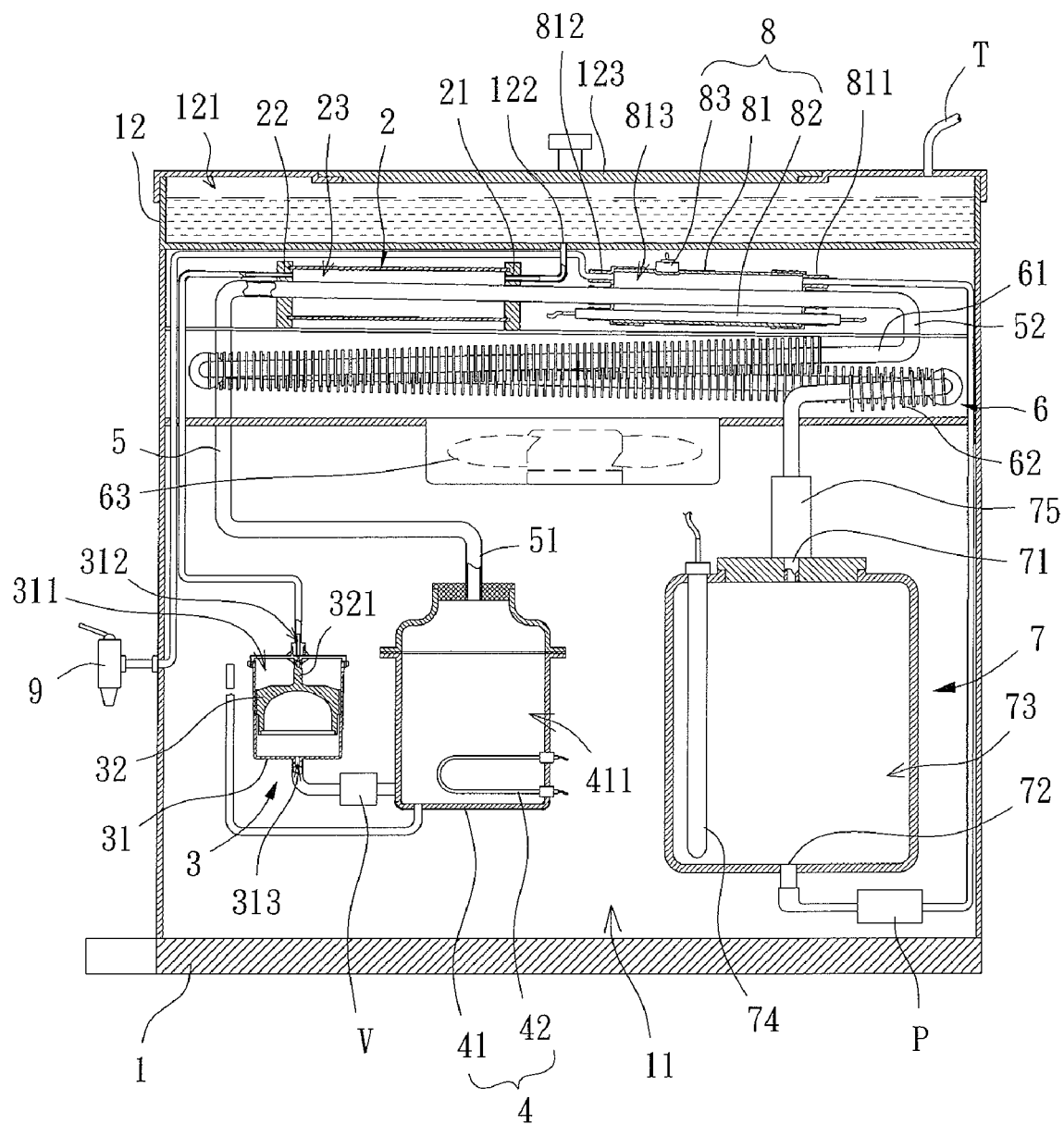
FIG. 1 shows a side cross sectional view of a distillation-type drinking fountain according to a preferred embodiment of the invention.

In the various figures of the drawings, the same numerals designate the same or similar parts. Furthermore, when the term "first", "second", "third", "fourth", "inner", "outer" "top", "bottom" and similar terms are used hereinafter, it should be understood that these terms are reference only to the structure shown in the drawings as it would appear to a person viewing the drawings and are utilized only to facilitate describing the invention.

DETAILED DESCRIPTION OF THE INVENTION

Referring to FIG. 1, a distillation-type drinking fountain comprising a housing 1, a heat-exchanging tube 2, a liquid level control unit 3, a hot water tank 4, a steam pipe 5, a condensing unit 6, a water-collecting container 7, an energy-saving heating unit 8 and an outlet valve 9 is disclosed according to a preferred embodiment of the invention. The heat-exchanging tube 2, liquid level control unit 3, hot water tank 4, steam pipe 5, condensing unit 6, water-collecting container 7, energy-saving heating unit 8 and outlet valve 9 are received in the housing 1 and communicate with each other via pipes. The outlet valve 9 is disposed outside the housing 1 and communicates with the energy-saving heating unit 8 via a pipe.

The housing 1 comprises a compartment 11 for receiving the heat-exchanging tube 2, liquid level control unit 3, hot water tank 4, steam pipe 5, condensing unit 6, water-collecting container 7 and energy-saving heating unit 8. The housing 1 further comprises a liquid providing unit 12 which is preferably a cool water tank. The liquid providing unit 12 comprises a liquid-storing room 121 and a liquid entry 122. The liquid-storing room 121 is used to store a liquid to be distilled. The liquid may be poured into the liquid-storing room 121 through an opening 123 of the liquid providing unit 12, or may be delivered to the liquid-storing room 121 via a water pipe T. The liquid entry 122 communicates with the liquid-storing room 121 and is preferably located on a bottom of the liquid providing unit 12. Thus, the liquid may flow out of the liquid-storing room 121 via the liquid entry 122.

Figure 2:
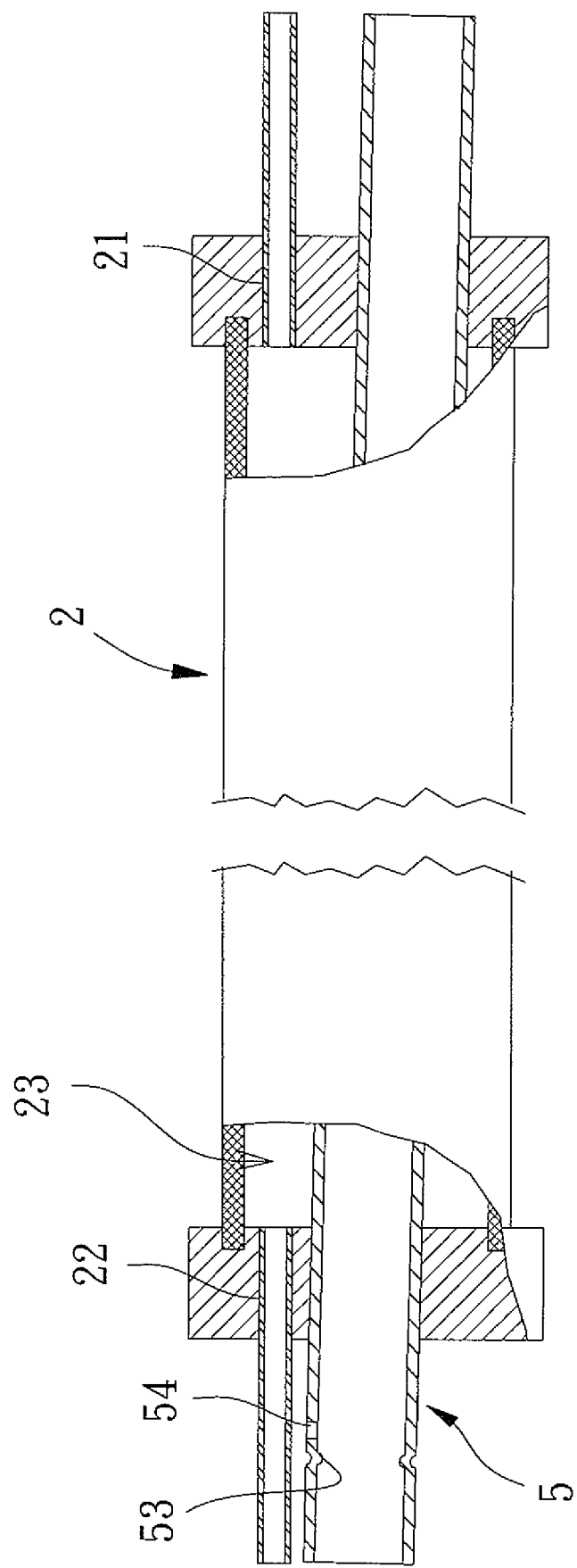
FIG. 2 shows a side cross sectional view of a heat-exchanging tube according to the preferred embodiment of the invention.

Referring to FIGS. 1 and 2, the heat-exchanging tube 2 has a liquid-incoming end 21, a liquid-outgoing end 22 and a heat-exchanging room 23. The liquid-incoming end 21 and the liquid-outgoing end 22 are located on two ends of the heat-exchanging tube 2 and communicate with the heat-exchanging room 23. The liquid-incoming end 21 communicates with the liquid entry 122 of the liquid providing unit 12 via a pipe. The liquid-outgoing end 22 communicates with the liquid level control unit 3 via another pipe. Based on this, the liquid in the liquid-storing room 121 may flow into the heat-exchanging room 23 via the liquid-incoming end 21. Also, the liquid in the heat-exchanging room 23 may then flow into the liquid level control unit 3 via the liquid-outgoing end 22.

Figure 3:
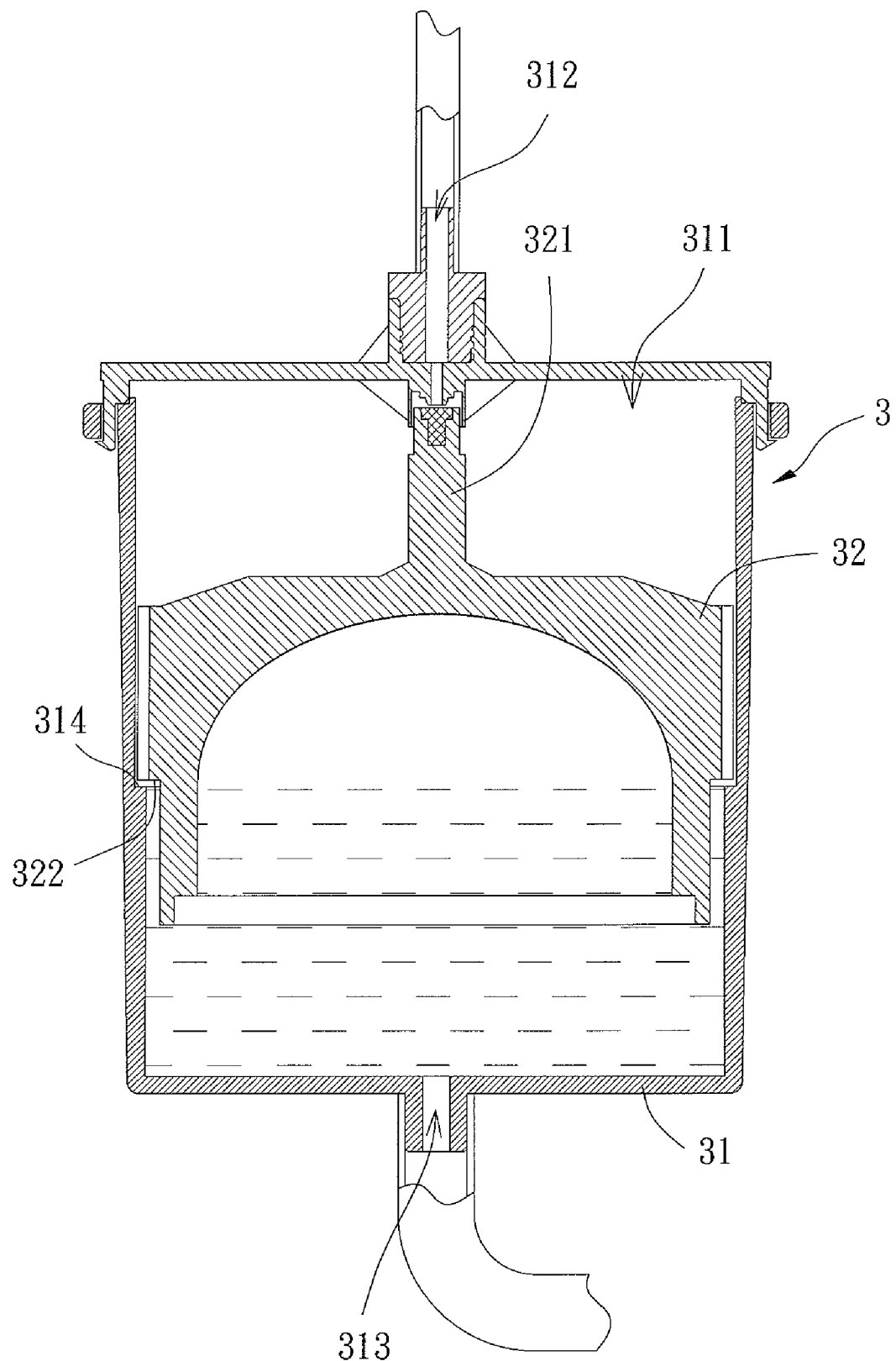
FIG. 3 shows a side cross sectional view of a liquid level control unit according to the preferred embodiment of the invention.

Referring to FIGS. 1 and 3, the liquid level control unit 3 is located between the heat-exchanging tube 2 and the hot water tank 4. The liquid level control unit 3 comprises a trough body 31 and a restrain member 32. The trough body 31 has a compartment 311 for receiving the liquid. The trough body 31 comprises a water inlet 312, a water outlet 313 and a first limiting portion 314. The compartment 311 communicates with the water inlet 312 and water outlet 313. The water inlet 312 is preferably located on a top of the trough body 31 and communicates with the liquid-outgoing end 22 of the heat-exchanging tube 2 via a pipe. The water outlet 313 is preferably located on a bottom of the trough body 31 and communicates with the hot water tank 4 via another pipe. Since a pipe is connected between the liquid level control unit 3 and the hot water tank 4, both the liquid level control unit 3 and the hot water tank 4 should have the same liquid level. The first limiting portion 314 is located on a proper location of an inner wall of the trough body 31.

The restrain member 32 is disposed in the compartment 311. The restrain member 32 must have a smaller density than the liquid so that the restrain member 32 can float on the liquid and be lifted or lowered by the lifting or lowering liquid. The restrain member 32 has a blocking portion 321 and a second limiting portion 322. The blocking portion 321 is aligned with the water inlet 312. The blocking portion 321 may block the water inlet 312 as the restrain member 32 lifts and may unblock the water inlet 312 as the restrain member 32 lowers. When the liquid level in the hot water tank 4 gradually approaches a maximum level, the restrain member 32 will be lifted up, and the blocking portion 321 will finally reach and block the water inlet 312, terminating the communication between the compartment 311 and the heat-exchanging room 23. Thus, the liquid in the heat-exchanging room 23 is prevented from flowing into the hot water tank 4 via the liquid level control unit 3, preventing the liquid in the hot water tank 4 to spill. The second limiting portion 322 is located on an outer surface of the restrain member 32 and is aligned with the first limiting portion 314. The second limiting portion 322 may contact with the first limiting portion 314 as the restrain member 32 lowers and may depart from the first limiting portion 314 as the restrain member 32 lifts. When the second limiting portion 322 contacts with the first limiting portion 314, a bottom of the restrain member 32 is spaced from the water outlet 313 by a proper distance, preventing the restrain member 32 from blocking the water outlet 313. The pipe communicating the water outlet 313 with the hot water tank 4 preferably has an anti-backflow member V for preventing the liquid in the hot water tank 4 from flowing back to the compartment 311.

Although the first limiting portion 314 and the second limiting portion 322 are designed as shoulder portions in the embodiment, they are not limited thereto.

Referring to FIG. 1 again, the hot water tank 4 has a body 41 and a heating unit 42. The body 41 has a heating room 411. The heating room 411 communicates with the compartment 311 via a pipe and stores the liquid from the liquid level control unit 3. The heating unit 42 is prepared for the body 41 and is preferably disposed in the body 41 to directly heat the liquid in the heating room 411. The heating unit 42 may be an electrothermal tube, a thermal chip or the like.

Referring to FIGS. 1 and 2, the steam pipe 5 has a first end 51 and a second end 52. The first end 51 extends through the body 41 to communicate with the heating room 411. The second end 52 extends through the heat-exchanging tube 2 to communicate with the condensing unit 6. Specifically, a part of the steam pipe 5 is received in the heat-exchanging room 23. The part of the steam pipe 5 received in the heat-exchanging room 23 is referred to as a first preheating portion hereinafter. The first preheating portion of the steam pipe 5 appears to be gently sloped from the liquid-outgoing end 22 towards the liquid-incoming end 21. The steam pipe 5 further has a shrinking portion 53 and an exhaust hole 54. The shrinking portion 53 is located on an inner wall of the steam pipe 5 and adjacent to the liquid-outgoing end 22 of the heat-exchanging tube 2. The exhaust hole 54 extends through a surface of the steam pipe 5 and is located on one side of the shrinking portion 53. When the steam in the steam pipe 5 flows from the first end 51 to the second end 52, it will pass through the shrinking portion 53 and the exhaust hole 54 in sequence. In this way, when the flowing steam passes through the shrinking portion 53, it will have a larger pressure due to a reduced path area, resulting in a faster flow speed thereafter. Thus, chlorine contained in the steam will be filtered out of the steam pipe 5 via the exhaust hole 54, thereby purifying the steam in the steam pipe 5.

Referring to FIG. 1 again, the condensing unit 6 consists of a condenser tube 61 and a plurality of cooling fins 62. The condenser tube 61 has one end communicating with the second end 52 of the steam pipe 5, as well as another end communicating with the water-collecting container 7. The condenser tube 61 is in a labyrinth form and disposed in the compartment 11 of the housing 1. The condenser tube 61 gently extends downward from one end communicating with the steam pipe 5 towards another end communicating with the water-collecting container 7. The cooling fins 62 are evenly arranged on an outer circumferential face of the condenser tube 61 so that the condenser tube 61 may have larger areas contacting the cooling fins 62 for cooling purposes. The condensing unit 6 further comprises a fan 63 disposed on one side of the condenser tube 61, providing air flows to the condenser tube 61 for cooling purposes.

The water-collecting container 7 comprises a water inlet 71, a liquid outlet 72 and a water-storing room 73. The water inlet 71 and liquid outlet 72 are respectively located on the top and bottom of the water-collecting container 7 and communicate with the water-storing room 73. The water inlet 71 communicates with one end of the condenser tube 61 via a pipe, and the liquid outlet 72 communicates with the energy-saving heating unit 8 via another pipe. The water-storing room 73 is used to store distilled water from the condensing unit 6. In addition, the water-collecting container 7 preferably further comprises a sterilization unit 74 and a filtering unit 75. The sterilization unit 74 is preferably an ultraviolet tube located in the water-storing room 73 for sterilizing the distilled water in the water-storing room 73. The filtering unit 75 is preferably disposed at the water inlet 71 for filtering the distilled water flowing into the water-storing room 73.

Figure 4:
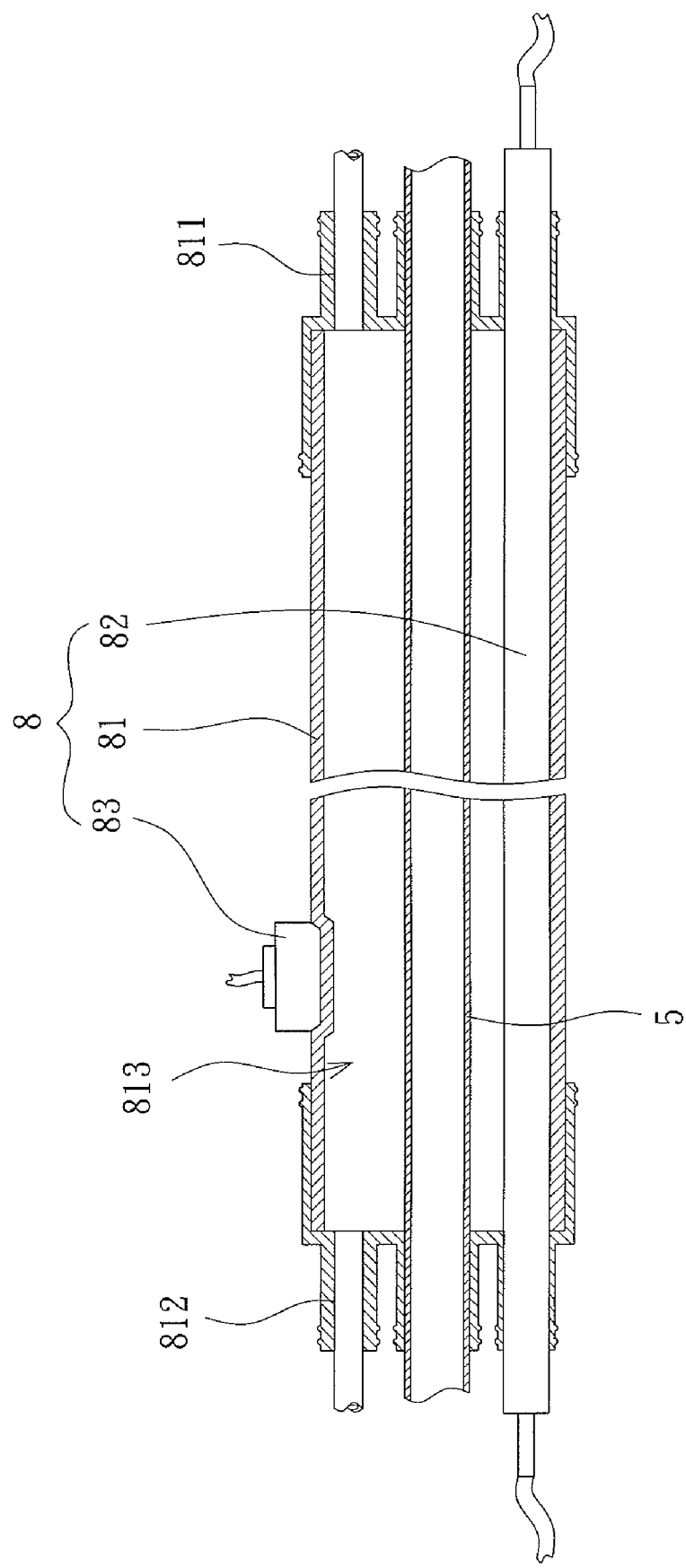
FIG. 4 shows a side cross sectional view of an energy-saving heating unit receiving a steam pipe according to the preferred embodiment of the invention.

Referring to FIGS. 1 and 4, the energy-saving heating unit 8 is disposed on another part of the steam pipe 5. Preferably, the energy-saving heating unit 8 is disposed between the heat-exchanging tube 2 and the condensing unit 6. The energy-saving heating unit 8 comprises an energy-saving heat-exchanging tube 81, a heating device 82 and a temperature control device 83. The energy-saving heat-exchanging tube 81 comprises a water-incoming end 811, a water-outgoing end 812 and an energy-saving heat-exchanging room 813. The water-incoming end 811 and the water-outgoing end 812 are located on two ends of the heat-exchanging tube 2 and communicate with the energy-saving heat-exchanging room 813. The water-incoming end 811 communicates with the liquid outlet 72 of the water-collecting container 7 via a pipe. The water-outgoing end 812 communicates with the outlet valve 9 via another pipe. Based on this arrangement, the distilled water in the water-storing room 73 may flow into the energy-saving heat-exchanging room 813 via the water-incoming end 811. Also, the distilled water in the energy-saving heat-exchanging room 813 may flow to the outlet valve 9 via the water-outgoing end 812. Here, the part of the steam pipe 5 received in the energy-saving heat-exchanging room 813 is referred to as a second preheating portion located between the first preheating portion and the second end 52 of the steam pipe 5.

The heating device 82 is preferably disposed in the energy-saving heat-exchanging room 813 for directly heating the distilled water in the energy-saving heat-exchanging room 813. The temperature control device 83 is electrically connected to the heating device 82. The temperature control device 83 may monitor a temperature of the distilled water in the energy-saving heat-exchanging room 813 in real time and control the heating device 82 to start operating. Moreover, the pipe communicating the liquid outlet 72 with the water-incoming end 811 may preferably comprise a pump P electrically connected to the outlet valve 9.

Figure 5:
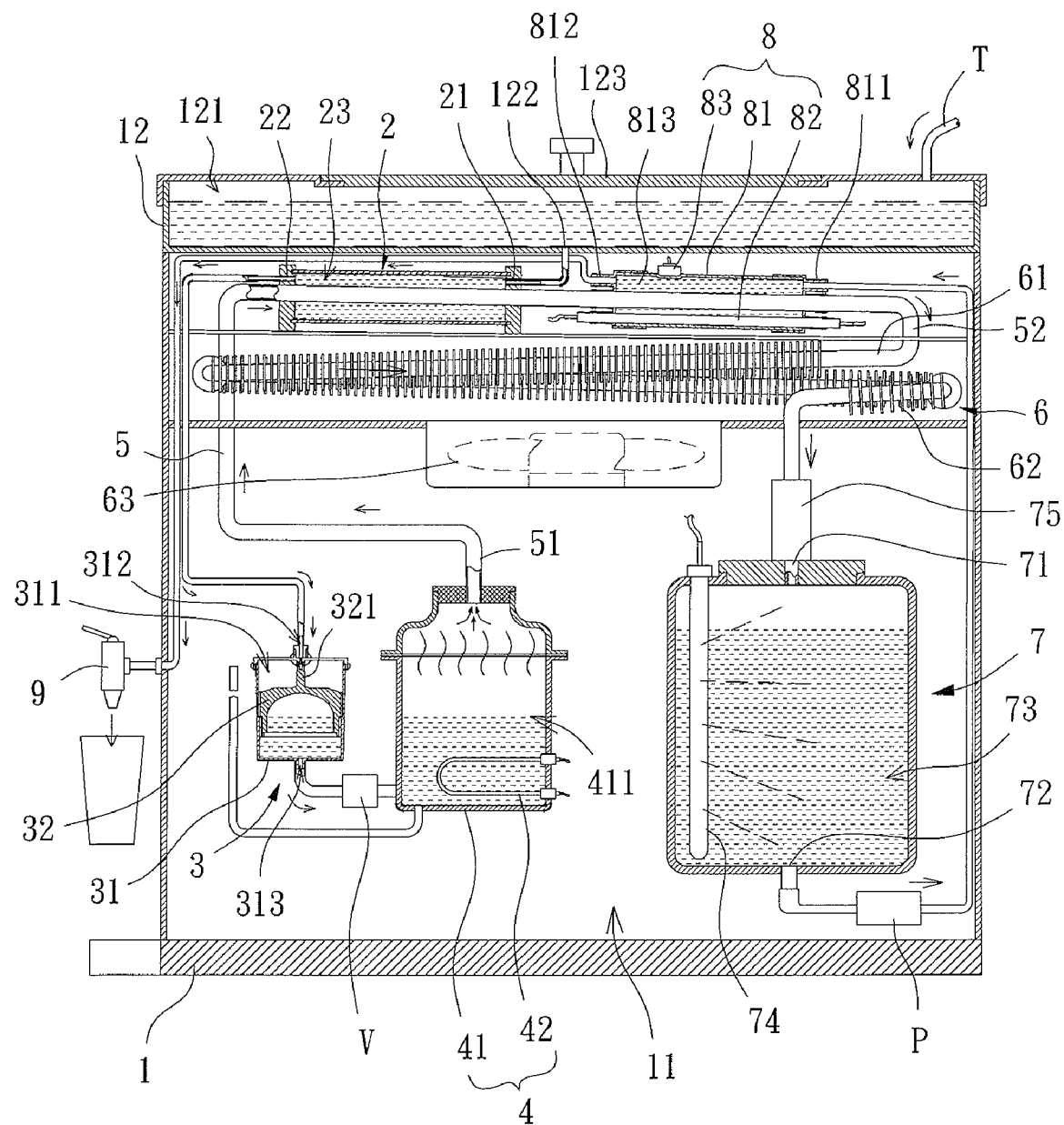
FIG. 5 shows a use of the distillation-type drinking fountain according to the preferred embodiment of the invention.

Referring to FIG. 5, when in use, the liquid enters the heat-exchanging room 23 of the heat-exchanging tube 2 via the liquid entry 122. The liquid in the heat-exchanging room 23 then flows out of the heat-exchanging room 23 via the liquid-outgoing end 22. The liquid in the heat-exchanging room 23 may enter the liquid level control unit 3 and then enter the heating room 411 of the hot water tank 4 via pipes. The heating unit 42 heats the liquid in the heating room 411 until a boiling point of the liquid is reached, vaporizing the moisture of the liquid into steam. The steam enters the steam pipe 5 and passes through the steam pipe 5 from the first end 51 to the second end 52. When the steam passes through the first preheating portion of the steam pipe 5, the steam may have a heat exchange with the liquid in the heat-exchanging room 23 via a pipe wall of the first preheating portion. In this way, the liquid in the heat-exchanging room 23 may be heated by the steam during the heat exchange. In the meanwhile, a portion of steam in the first preheating portion is condensed into water, resulting in existence of both steam and water in the first preheating portion of the steam pipe 5.

Since the first preheating portion of the steam pipe 5 is sloped from the liquid-outgoing end 22 towards the liquid-incoming end 21, the steam and the water in the first preheating portion may be directed into the condenser tube 61 via the first preheating portion and the second end 52. The steam and water that enter the condenser tube 61 flow towards the water inlet 71 of the water-collecting container 7 along the sloping condenser tube 61. In the meanwhile, since the steam and water have a constant heat exchange with the sloping condenser tube 61, the steam may be cooled down and completely becomes water. Finally, the water is directed to and stored in the water-storing room 73 of the water-collecting container 7.

When it is desired to obtain the distilled water in the water-collecting container 7 for drinking purposes, the outlet valve 9 may issue a control signal to the pump P so that the distilled water in the water-collecting container 7 may be delivered to the outlet valve 9 for a user. In another case, if it is desired to heat up the distilled water in the water-storing room 73 for drinking purposes, the distilled water will enter the energy-saving heat-exchanging room 813 via the liquid outlet 72 and the water-incoming end 811 in sequence. Since the first preheating portion contains a mixture of steam and water and the mixture has a relatively higher temperature than the distilled water, when the mixture flows from the first preheating portion to the second preheating portion, the mixture will have a heat exchange with the distilled water contained in the energy-saving heat-exchanging room 813 via a pipe wall of the second preheating portion. In this way, the distilled water in the energy-saving heat-exchanging room 813 may be heated in advance. During the heat exchange taking place in the second preheating portion, if the temperature control device 83 detects that the distilled water in the energy-saving heat-exchanging room 813 has reached a proper temperature suitable for drinking purposes, the temperature control device 83 will not trigger the heating device 82 to start operating. On the contrary, if the temperature control device 83 detects that the distilled water in the energy-saving heat-exchanging room 813 has not reached the proper temperature suitable for drinking purposes, the temperature control device 83 will issue a command to the heating device 82 to trigger operation of the heating device 82. Upon receipt of the command, the heating device 82 will heat the distilled water in the energy-saving heat-exchanging room 813.

In the invention, the distilled water in the water-collecting container 7 is designed to pass through the energy-saving heating unit 8 before reaching the outlet valve 9. As the distilled water passes through the energy-saving heating unit 8, the mixture of steam and water in the second preheating portion, which has a relatively higher temperature than the distilled water, will have a heat exchange with the distilled water. In this way, the distilled water may be heated by the mixture, reducing the temperature difference between the distilled water and the proper temperature suitable for drinking purposes. Therefore, it will take less energy (or even no energy) for the heating device 82 to heat the distilled water by the proper temperature. Through the mechanism, energy saving is accomplished.

Furthermore, the liquid in the liquid providing unit 12 will pass through the heat-exchanging tube 2 before reaching the heating room 411 of the hot water tank 4. In this way, the steam in the first preheating portion of the steam pipe 5, which has a relatively higher temperature than the liquid in the heat-exchanging room 23, will have a heat exchange with the liquid. Thus, the liquid may be heated in advance, reducing the temperature difference between the liquid entering the heating room 411 and the boiling point. Therefore, it will take less energy for the heating unit 42 to vaporize the moisture of the liquid into steam, thus efficiently reducing the energy consumption of the heating unit 42.

Although the invention has been described in detail with reference to its presently preferable embodiment, it will be understood by one of ordinary skill in the art that various modifications can be made without departing from the spirit and the scope of the invention, as set forth in the appended claims.

What is claimed is:

1. An energy-saving distillation device comprising:
   a liquid providing unit having a liquid entry;
   a first heat-exchanging tube having a liquid-incoming end, a liquid-outgoing end and a first heat-exchanging room, wherein the liquid-incoming end communicates with the liquid entry, and wherein the liquid-incoming end and the liquid-outgoing end communicate with the first heat-exchanging room;
   a hot water tank having a body and a heating unit, wherein the body has a heating room communicating with the liquid-outgoing end of the first heat-exchanging tube;
   a steam pipe having a first end and a second end, wherein the first end communicates with the heating room, and wherein a first part of the steam pipe is received in the first heat-exchanging room;
   a condensing unit having a condenser tube, wherein the condenser tube has one end communicating with the second end of the steam pipe;
   a water-collecting container having a water-storing room communicating with another end of the condenser tube;
   an energy-saving heating unit comprising a second heat-exchanging tube, a heating device and a temperature control device electrically coupled to the heating device, wherein a second part of the steam pipe not overlapping the first part of the steam pipe is received in the second heat-exchanging tube, wherein the second heat-exchanging tube comprises a water-incoming end, a water-outgoing end and a second heat-exchanging room, wherein the water-incoming end communicates with the water-storing room, the water-incoming end and the water-outgoing end communicate with the second heat-exchanging room, with the heating device and the first part of the steam pipe received in the second heat-exchanging room; and
   an outlet valve communicating with the water-outgoing end of the second heat-exchanging tube; and
   a liquid level control unit disposed between the first heat-exchanging tube and the hot water tank, wherein the liquid level control unit communicates with the liquid-outgoing end of the first heat-exchanging tube and the heating room of the hot water tank,
   wherein the liquid level control unit comprises a trough body and a restrain member, wherein the trough body has a compartment storing a liquid, and wherein the restrain member is disposed in the compartment and has a smaller density than the liquid.

2. The energy-saving distillation device as claimed in claim 1, wherein the energy-saving heating unit is located between the first heat-exchanging tube and the condensing unit.

3. The energy-saving distillation device as claimed in claim 1, wherein the trough body comprises a water inlet and a water outlet, wherein the water inlet and the water outlet communicate with the compartment, wherein the water inlet communicates with the liquid-outgoing end of the first heat-exchanging tube, and wherein the water outlet communicates with the heating room of the hot water tank.

4. The energy-saving distillation device as claimed in claim 3, wherein the restrain member comprises a blocking portion, and wherein the blocking portion blocks the water inlet of the trough body as the restrain member lifts and unblocks the water inlet of the trough body as the restrain member lowers.

5. The energy-saving distillation device as claimed in claim 1, wherein the trough body comprises a first limiting portion located on an inner wall thereof, wherein the restrain member comprises a second limiting portion located on an outer surface thereof, and wherein the second limiting portion contacts with the first limiting portion as the restrain member lowers and departs from the first limiting portion as the restrain member lifts.

6. The energy-saving distillation device as claimed in claim 1, wherein the condensing unit further comprises a plurality of cooling fins disposed on an outer circumferential face of the condenser tube with even distance.

7. The energy-saving distillation device as claimed in claim 1, wherein the condensing unit further comprises a fan located on one side of the condenser tube for cooling the condenser tube.

8. The energy-saving distillation device as claimed in claim 1, wherein the water-collecting container further comprises a sterilization unit and a filtering unit, wherein the sterilization unit is disposed in the water-storing room, and wherein the filtering unit is disposed at a pipe communicating the condenser tube with the water-collecting container.

9. The energy-saving distillation device as claimed in claim 1, further comprises a pump disposed at a pipe communicating a liquid outlet of the water-collecting container with the water-incoming end of the second heat-exchanging tube.

10. The energy-saving distillation device as claimed in claim 1, wherein the steam pipe further comprises a shrinking portion and an exhaust hole, wherein the shrinking portion is located on an inner wall of the steam pipe and adjacent to the liquid-outgoing end of the first heat-exchanging tube, and wherein the exhaust hole extends through a surface of the steam pipe and is located on one side of the shrinking portion.

11. An energy-saving distillation device comprising:
    a liquid providing unit having a liquid entry;
    a first heat-exchanging tube having a liquid-incoming end, a liquid-outgoing end and a first heat-exchanging room, wherein the liquid-incoming end communicates with the liquid entry, and wherein the liquid-incoming end and the liquid-outgoing end communicate with the first heat-exchanging room;
    a hot water tank having a body and a heating unit, wherein the body has a heating room communicating with the liquid-outgoing end of the first heat-exchanging tube;
    a steam pipe having a first end and a second end, wherein the first end communicates with the heating room, and wherein a first part of the steam pipe is received in the first heat-exchanging room;

a condensing unit having a condenser tube, wherein the condenser tube has one end communicating with the second end of the steam pipe;

a water-collecting container having a water-storing room communicating with another end of the condenser tube;

an energy-saving heating unit comprising a second heat-exchanging tube, a heating device and a temperature control device electrically coupled to the heating device, wherein a second part of the steam pipe not overlapping the first part of the steam pipe is received in the second heat-exchanging tube, wherein the second heat-exchanging tube comprises a water-incoming end, a water-outgoing end and a second heat-exchanging room, wherein the water-incoming end communicates with the water-storing room, the water-incoming end and the water-outgoing end communicate with the second heat-exchanging room, with the heating device and the first part of the steam pipe received in the second heat-exchanging room; and an outlet valve communicating with the water-outgoing end of the second heat-exchanging tube;

a liquid level control unit disposed between the first heat-exchanging tube and the hot water tank, wherein the liquid level control unit communicates with the liquid-outgoing end of the first heat-exchanging tube and the heating room of the hot water tank; and an anti-backflow member disposed on a pipe communicating the liquid level control unit with the hot water tank.

* * * * *